United States Patent
Haschke et al.

(10) Patent No.: US 11,788,982 B2
(45) Date of Patent: Oct. 17, 2023

(54) DEVICE AND METHOD FOR MEASURING A WEAR CONDITION OF PLAIN BEARING OR GUIDE ELEMENTS

(71) Applicant: SMS group GmbH, Düsseldorf (DE)

(72) Inventors: Thomas Haschke, Bad Berleburg (DE); Torsten Müller, Kreuztal (DE); Johannes Alken, Siegen (DE); Thorsten Huge, Kreuztal (DE); Matthias Kipping, Herdorf (DE)

(73) Assignee: SMS group GmbH, Düsseldorf (DE)

(*) Notice: Subject to any disclaimer, the term of this patent is extended or adjusted under 35 U.S.C. 154(b) by 426 days.

(21) Appl. No.: 17/283,032

(22) PCT Filed: Oct. 8, 2019

(86) PCT No.: PCT/EP2019/077232
§ 371 (c)(1),
(2) Date: Apr. 6, 2021

(87) PCT Pub. No.: WO2020/074519
PCT Pub. Date: Apr. 16, 2020

(65) Prior Publication Data
US 2021/0349046 A1    Nov. 11, 2021

(30) Foreign Application Priority Data
Oct. 8, 2018   (DE) ............... 10 2018 217 133.5

(51) Int. Cl.
*G01N 27/20* (2006.01)
*F16C 13/04* (2006.01)
(Continued)

(52) U.S. Cl.
CPC ............ *G01N 27/20* (2013.01); *F16C 13/04* (2013.01); *F16C 17/246* (2013.01);
(Continued)

(58) Field of Classification Search
CPC .......... G01N 27/20; G01N 3/56; F16C 13/04; F16C 17/246; F16C 2233/00;
(Continued)

(56) References Cited

U.S. PATENT DOCUMENTS 4,095,552 A * 6/1978 Lo ........................... F16C 17/24
                                                    116/208
5,950,478 A   9/1999 Sato et al.
(Continued)

FOREIGN PATENT DOCUMENTS

AT         322970 B      6/1975
CN      101356020 A      1/2009
(Continued)

OTHER PUBLICATIONS

Joseph Davidson, Changki Mo; "Recent Advances in Energy Harvesting Technologies for Structural Health Monitoring Applications," Smart Materials Research, Jan. 1, 2014, vol. 2014, pp. 1-14.

*Primary Examiner* — Curtis J King
(74) *Attorney, Agent, or Firm* — Smartpat PLC (57) ABSTRACT

A device for measuring a wear condition on the plain bearing surface of a sensor plate comprises a measuring apparatus, which has wear sensors of a sensor plate integrated into the plain bearing surface. To capture the material removal at the plain bearing surface due to wear an evaluation apparatus is in signal connection with the wear sensors. The evaluation apparatus is designed, with respect to programming, in such a way that a change, in particular an increase, in the ohmic resistance value of the electrical conductor of a certain wear sensor can be captured in dependence on its own material removal, in order to thereby ensure that the amount of the material removal at the plain bearing surface and/or the remaining thickness of the plain bearing surface at the
(Continued)

location of said certain wear sensor can be inferred from the detected change in the resistance value.

18 Claims, 10 Drawing Sheets

(51) Int. Cl.
  *F16C 17/24* (2006.01)
  *F16D 66/02* (2006.01)
  *G01N 3/56* (2006.01)
(52) U.S. Cl.
  CPC .............. *F16D 66/027* (2013.01); *G01N 3/56* (2013.01); *F16C 2233/00* (2013.01); *F16C 2322/12* (2013.01)
(58) Field of Classification Search
  CPC ...... F16C 2322/12; F16C 41/00; F16C 43/02; F16C 13/00; F16D 66/027; F16D 66/021
  See application file for complete search history.

(56) References Cited

U.S. PATENT DOCUMENTS

| | | | |
|---|---|---|---|
| 11,041,526 B1* | 6/2021 | Calago | F16C 29/02 |
| 2008/0140361 A1* | 6/2008 | Bonissone | G05B 23/0283 |
| | | | 703/2 |
| 2009/0140840 A1* | 6/2009 | Corts | F16C 19/52 |
| | | | 72/235 |
| 2009/0145694 A1* | 6/2009 | Corts | F16C 13/00 |
| | | | 184/7.4 |
| 2009/0165521 A1* | 7/2009 | Corts | F16C 33/108 |
| | | | 384/13 |
| 2010/0005897 A1 | 1/2010 | Fleury et al. | |
| 2010/0183253 A1* | 7/2010 | Hirata | F16C 32/0666 |
| | | | 384/118 |
| 2012/0050041 A1* | 3/2012 | Corts | F16C 41/008 |
| | | | 340/572.1 |
| 2014/0169711 A1* | 6/2014 | Hanaka | F16C 17/02 |
| | | | 384/284 |
| 2015/0241873 A1* | 8/2015 | Goldenberg | G05B 19/41865 |
| | | | 700/97 |
| 2020/0222957 A1* | 7/2020 | Alken | B21B 31/074 |
| 2022/0143661 A1* | 5/2022 | Toschi | G06N 3/08 |

FOREIGN PATENT DOCUMENTS

| | | |
|---|---|---|
| CN | 101395460 A | 3/2009 |
| CN | 101821027 A | 9/2010 |
| CN | 102189109 A | 9/2011 |
| CN | 102236322 A | 11/2011 |
| CN | 103817153 A | 5/2014 |
| DE | 2115506 C3 | 10/1972 |
| DE | 4443210 A1 | 6/1996 |
| DE | 102017205886 A1 | 10/2018 |
| GB | 1380302 A | 1/1975 |
| JP | H06265335 A | 9/1994 |
| JP | 2013088173 A | 5/2013 |
| KR | 20110127499 A | 11/2011 |
| RU | 2147474 C1 | 4/2000 |
| SU | 899184 A1 | 1/1982 |
| WO | 02075271 A1 | 9/2002 |

* cited by examiner

DEVICE AND METHOD FOR MEASURING A WEAR CONDITION OF PLAIN BEARING OR GUIDE ELEMENTS

TECHNICAL FIELD

The disclosure relates to a plain bearing or guide element in the form of a sensor plate for rolling mills, and to a device and method for measuring a wear condition on the plain bearing surface of a sensor plate.

BACKGROUND

According to the prior art, a device and a method for determining the wear on a wear surface are each known from DE 10 2017 205 886 A1 and for example also from DE 21 15 506 A. A wear sensor in the form of an electrical resistor, which itself is mechanically removed upon the material removal at the wear surface, is used here. In DE 10 2017 205 886 A1, to obtain a better overview of the distribution of the wear layer thickness or the material removal over the wear surface, a plurality of wear sensors can be arranged in a manner distributed in the wear layer.

From JP 2013 088173 A a sensor plate according to the preamble of claim 1 is known, which can be used in an industrial machine.

WO 02/075271 A shows a bearing element and a measuring device for determining the state of wear of bearing elements. The bearing element can serve as a plate-shaped plain bearing or guide element for roll stands and has a plain bearing surface that is subject to wear when the roll stands are in operation. A measuring bore is formed in the bearing element and extends from the plain bearing surface into the interior of the bearing element. By means of a suitable depth measuring device, which can be arranged in this measuring bore, it is possible to determine the thickness of the bearing element and thus its state of wear "over the depth".

In the article by Joseph Davidson et al.: "Recent Advances in Energy Harvesting Technologies for Structural Health Monitoring Applications") it is known that monitoring systems are fed by an autonomous energy source, wherein this energy is obtained, for example, from local pressure conditions, vibrations, thermal gradients or the like.

From EP 2 637 014 A1 and US 2007/163325 A1, measuring devices for determining a state of wear on a plain bearing surface are known, wherein a plurality of wear sensors are used.

SUMMARY

The disclosure is based on the object of optimizing wear measurement on a plain bearing or guide element and thereby also improve production planning when using rolling mills.

This object is achieved by a sensor plate as described in this paper, by a device for measuring a wear condition as described, and by a method for measuring a wear condition as described.

A sensor plate serves as a plain bearing or guide element for rolling mills, and comprises at least one plain bearing surface that can be brought into contact with a component and is subject to wear during the operation of a rolling mill, and a plurality of wear sensors. The wear sensors are suitable for capturing material removal on the plain bearing surface and for this purpose each comprise an electrical resistor, which is formed from at least one electrical conductor, which is preferably arranged in a manner running in sections parallel to the plain bearing surface, wherein the wear sensors themselves are mechanically removed with the material removal on the plain bearing surface. Specifically, the wear sensors are provided in the form of an (m×n) matrix integrated into the plain bearing surface, wherein the parameters m and n assume at least a value of 2 or a value >2. In addition, a plurality of measuring sensors are provided, which are integrally received in the sensor plate and arranged in the form of an (a×b) matrix adjacent to the plain bearing surface in such a way that, on the one hand, they are not subject to wear on the plain bearing surface, but, on the other hand, they are able to capture the forces and/or strains and/or deformations acting on the sensor plate, which occur as a result of surface, line or point contact of the sensor plate with the component, wherein the parameters a and b, with which the (a×b) matrix for the arrangement of the measuring sensors is formed, each consist of integer values selected from the numerical range {1-100}.

The present disclosure further provides a device for measuring a wear condition on the plain bearing surface of a sensor plate, and comprises a measuring apparatus, which has the wear sensors of the sensor plate specified above integrated into the plain bearing surface, in order to capture the material removal on the plain bearing surface in the event of wear. Furthermore, the device comprises an evaluation apparatus that is at least in signal connection with the wear sensors or measuring sensors, as the case may be, and from which the signal values of the sensors and in particular of the individual wear sensors can be received. The evaluation apparatus is designed, with respect to programming, in such a way that a change, in particular an increase, in the ohmic resistance value of the electrical conductor of a certain wear sensor can be captured in dependence on its own material removal, in order to thereby ensure that the amount of the material removal at the plain bearing surface and/or the remaining thickness of the plain bearing surface at the location of said certain wear sensor can be inferred from the detected change in the resistance value.

Using the device specified above, the present disclosure also provides a method for measuring a wear condition of plain bearing or guide elements during the operation of a rolling mill, with which, in particular, the device specified above is used. This method includes the steps:

(i) determining a wear condition on a sensor plate that it is attached to a chock of a roll of a rolling mill and a current geometry (topography) of the associated plain bearing surface, (ii) determining a wear condition on a sensor plate that is attached to a rolling mill housing of a rolling mill and a current geometry (topography) of the associated plain bearing surface, (iii) carrying out steps (i) and (ii) for all sensor plates attached to the chocks of rolls and to the rolling mill housings of the rolling mill, (iv) transmitting the measured values of step (iii) to a central system with a storage and evaluation unit, wherein such measured values are each assigned to a certain set of rolls consisting of a certain roll, the chocks provided therefor and the sensor plate attached to them, and to a certain rolling mill housing of the rolling mill with a sensor plate.

The disclosure is initially based on the essential finding that, with the aid of the characteristic integration of a plurality of wear sensors in the form of an (m×n) matrix in the plain bearing surface of a sensor plate, it is possible to obtain more precise information with respect to the wear on the plain bearing surface of such sensor plate compared with the prior art. Based on this, it is also possible, by means of a suitable measurement data analysis in a computer or central system with a memory and evaluation unit, to determine so-called "matching partners" between, on the one hand, certain sets of rolls (consisting of rolls, the associated chocks and the sensor plates attached to them) and, on the other hand, certain rolling mill housings of a rolling mill, specifically with regard to the wear condition of the associated sensor plates and their respective "topography" on their sliding surfaces.

It can be provided that the electrical resistance of a wear sensor is formed from a plurality of electrical conductors, which are preferably arranged at least in sections in parallel and at different depths with respect to the plain bearing surface. Thereby, it is possible to monitor different wear limits with a single type of wear sensor on the sliding surface of a sensor plate with inexpensive means and at the same time a high degree of accuracy.

It can be provided that the sensor plate is not only equipped with a plurality of wear sensors in its sliding surface, but that, in addition, a plurality of measuring sensors are provided, which are arranged in the form of an (a×b) matrix adjacent to the plain bearing surface. Thereby, such measuring sensors are arranged adjacent to the sliding surface of a sensor plate in such a way that, on the one hand, they are not subject to wear on the plain bearing surface, but, on the other hand, they are able to capture the forces and/or strains and/or deformations acting on the sensor plate, which occur as a result of surface, line or point contact of the sensor plate with the component.

At this point, it is separately pointed out that, within the meaning of the present disclosure, a measuring sensor is a sensor that is capable of capturing forces and/or strains and/or deformations that may occur in or on a plate-shaped element in the form of the sensor plate, if such sensor plate comes into contact with another component during the operation of a rolling mill or a rolling train, as the case may be.

The measuring sensors just mentioned, with which a sensor plate can additionally be equipped, are arranged inside the sensor plate and preferably adjacent to its plain bearing surface. This means that such a measuring sensor is thus suitably integrated into the sensor plate. It is important that the measuring sensor is arranged in a manner not directly exposed to the plain bearing surface of the sensor plate, such that the measuring sensor is not damaged or destroyed in the event of wear of the plain bearing surface during the operation of a rolling mill with which the sensor plate is used.

The measuring sensors can be arranged within the sensor plate by forming a plurality of blind holes in the sensor plate. The measuring sensors are then accommodated or inserted within such blind holes. In this respect, it is understood that, in the manufacture of such a sensor plate, the blind holes can be made in the sensor plate from a rear side opposite to the plain bearing surface. In addition and/or as an alternative, it is also possible to drill such a blind hole from a lateral edge surface of the sensor plate. The direction from which a respective blind hole is drilled to accommodate a measuring sensor in the sensor plate in the course of its manufacture depends in each case on the specific dimensions of a sensor plate and its installation in a rolling mill.

The parameters m and n, with which the (m×n) matrix for the arrangement of the wear sensors is formed, and the parameters a and b, with which the (a×b) matrix for the arrangement of the measuring sensors is formed, can each consist of integer values, in such a way that the matrix arrangement of the wear sensors or of the measuring sensors, as the case may be, is thus adapted to the circumferential contour of the sensor plate. In this respect, it is understood that a determination of the wear condition of a sensor plate and its "topography" with respect to wear is more accurate or precise, the larger the parameters m and n are selected for the matrix arrangement of the wear sensors. This is due to the larger area coverage on the plain bearing surface by the wear sensors integrated in it. The corresponding coverage of the plain bearing surface by the measuring sensors arranged adjacent to it thereby enables supplementary measured values, with which the wear values obtained by the wear sensors can be verified.

The parameters m and n, with which the (m×n) matrix for the arrangement of the wear sensors is formed, and in the same way also the parameters a and b, with which the (a×b) matrix for the arrangement of the measuring sensors is formed, can each consist of integer values selected from the numerical range {1-100} preferably from the numerical range {1-50}, further preferably from the numerical range {1-20}. For example, the measuring sensors or wear sensors, as the case may be, can be arranged in the form of a 2×2 matrix, in the form of a 3×2 matrix, in the form of a 3×1 matrix, in the form of a 3×3 matrix, in the form of a 4×4 matrix, in the form of a 5×5 matrix, in the form of a 6×6 matrix, in the form of a 6×4 matrix, in the form of a 7×7 matrix, in the form of an 8×8 matrix, in the form of a 9×9 matrix, in the form of a 10×10 matrix, in the form of an 11×11 matrix or in the form of a 12×12 matrix.

At least one machine-readable data memory can be attached to or provided, as the case may be, on the sensor plate, in which signal values or measured values, as the case may be, of the wear sensors can be stored. In the same way, the measured values of the measuring sensors can also be stored in this data memory if such sensors are additionally integrated in the plain bearing surface of a sensor plate.

In order to transmit the measured values, which have been stored in the data memory specified above, for example, to an external communication partner, it is expedient if the sensor plate is equipped with a transmitting unit, which is in signal connection with the wear sensors in any case, and if necessary also with the optionally provided measuring sensors. The measured values of the sensors can be transmitted to an evaluation apparatus via a radio link or by cable.

With regard to a spatial assignment of the measured values obtained, in particular of the wear sensors, it is expedient to know at which position in a rolling mill such sensor plates are installed or mounted, as the case may be, for example on which set of rolls or on which specific rolling mill housing. For this purpose, an advantageous additional form of the disclosure provides that the sensor plates are each equipped with a data carrier with a machine-readable identifier, by means of which the sensor plate can be uniquely identified and its position in the rolling mill can be localized. For example, such a data carrier can be formed from an RFID transponder, from an NFC (near-field communication) element, and/or from a QR code. In this way, a clear identification in conjunction with a corresponding localization is ensured for the sensor plates installed in a rolling mill.

At this point, it is separately pointed out that it is possible, for example, in the course of changeover of a rolling mill, to dismantle a chock from a roll and replace it with another chock. In this respect, it is understood that the unique identifiability or localization, as the case may be, specified above for a sensor plate, which is possible thanks to the data carrier with a machine-readable identifier (for example, RFID transponder, NFC and/or QR code), always refers to a certain chock to which a certain sensor plate is attached or fastened, as the case may be. In fact, as a rule, such sensor plates, at least as long as they function and are not excessively worn, are not disassembled from an assigned chock.

As already explained, it may be advisable for a sensor plate to be attached to a chock of a roll. This is possible in the same way for a work roll and/or for a backup roll, in short for any roll in a rolling mill.

In addition and/or as an alternative, it is recommended that a sensor plate is attached to a rolling mill housing of a rolling mill.

It can be provided for the device that its evaluation apparatus is in signal connection with a central system with a memory and evaluation unit. The data from the evaluation apparatus can be transmitted to the central system via a signal path and then evaluated therein. To implement data transmission, it is expedient for the evaluation apparatus to be equipped with a communications module, which enables the evaluation apparatus to exchange data with the central system and/or with external communication partners.

With regard to an evaluation of the data within the central system, its evaluation unit is designed, with respect to programming, in such a way that a change, in particular an increase, in the ohmic resistance value of the electrical conductor of a certain wear sensor in dependence on its own material removal can be captured, in order to thereby ensure that the amount of the material removal at the plain bearing surface and/or the remaining thickness of the plain bearing surface at the location of said certain wear sensor can be inferred from the detected change in the resistance value.

With respect to the method specified above, it is further expedient that the current wear condition or the current topography of sensor plates for a pairing comprising a certain set of rolls and a certain rolling mill housing is compared with a first predetermined limit value, wherein, if such first predetermined limit value is exceeded, at least one warning signal is triggered for initiating a check or maintenance, as the case may be, of the rolling mill and/or the set of rolls. In the course of this, it is also possible to define a second predetermined limit value, which, if exceeded, then at least triggers a warning signal for an operating stop of the rolling mill or, if necessary, an emergency stop for the rolling mill is automatically initiated.

The present disclosure is aimed at creating an "intelligent wear measurement" for a rolling mill, with which it is possible to determine, at practically any time and "online," that is, also during ongoing rolling operation, which state of wear or degree of wear, as the case may be, has currently occurred at which sensor plate. Thereby, the arrangement of the plurality of wear sensors in the form of an (m×n) matrix is advantageous, thanks to the dense or gap-free, as the case may be, arrangement of the wear sensors over the entire area of the plain bearing surface of a sensor plate that is thus possible.

The use of the present sensor plate is particularly suitable for heavy plate mills, for cluster mills (for example, Sendzimir mills) or for warm-rolling or cold-rolling trains.

Examples of embodiments of the invention are described in detail below with reference to a schematically simplified drawings.

DETAILED DESCRIPTION

With reference to FIGS. 1-20, preferred embodiments of a sensor plate 1 and a device 100, which can be used to measure a wear condition on the plain bearing surface of a sensor plate, are shown and explained below. Furthermore, the flow chart of FIG. 21 illustrates the sequence of a method for measuring a wear condition of plain bearing or guide elements during the operation of a rolling mill. Identical features in the drawing are each marked with the same reference signs. At this point, it is separately pointed out that the drawing is only simplified and in particular shown without scale.

Figure 1:
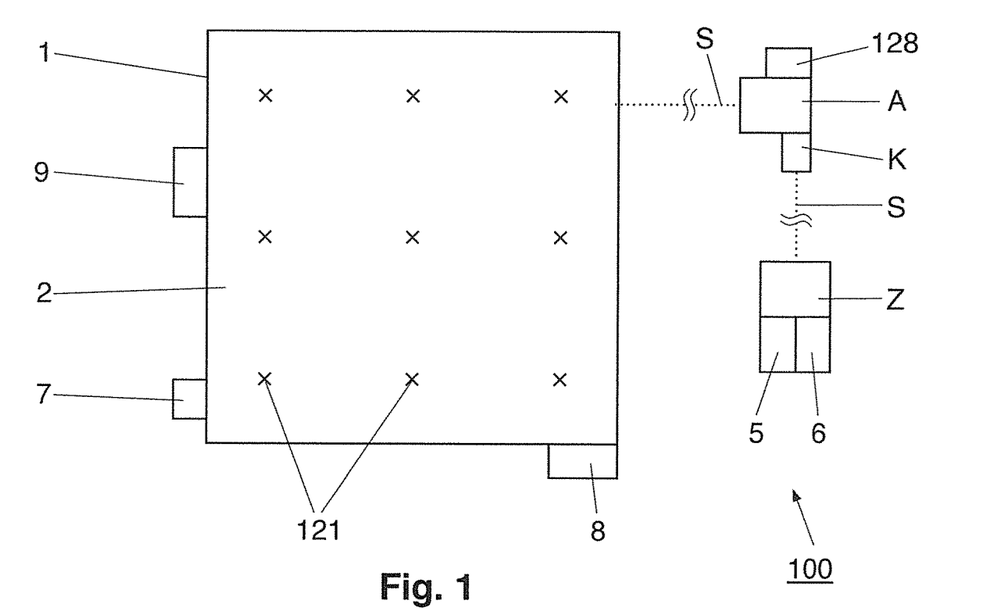
FIG. 1 is a plan view of a sensor plate, and an illustration of a device with such a sensor plate.

FIG. 1 shows a plan view of a sensor plate 1. This sensor plate can serve as a plain bearing or guide element for rolling mills. For this purpose, the sensor plate 1 has a plain bearing surface 2 on one side. If the sensor plate 1 is mounted in a rolling mill, for example on the chock of a work or backup roll or on a rolling mill housing of a rolling mill, the plain bearing surface 2 of the sensor plate 1 can come into contact with an adjacent component and can be subject to wear in the process.

The sensor plate 1 is equipped with a plurality of wear sensors 121. For simplicity, such wear sensors 121 are each symbolized with an "x" in the plan view of FIG. 1. The wear sensors 121 are either directly integrated into the plain bearing surface 2, or extend adjacent to the plain bearing surface 2.

The wear sensors 121 are arranged in the form of an (m×n) matrix in a manner distributed over the plain bearing surface 2. The parameter m determines the number of wear sensors 121 in the vertical direction and the parameter n determines the number of wear sensors in the horizontal direction. The parameters m and n for the matrix arrangement of the wear sensors 121 can be selected from the numerical range of {1-100}, in any combination with each other.

In the embodiment shown in FIG. 1, the wear sensors are integrated in the form of a 3×3 matrix in the plain bearing surface 2 of the sensor plate 1.

Figure 3:
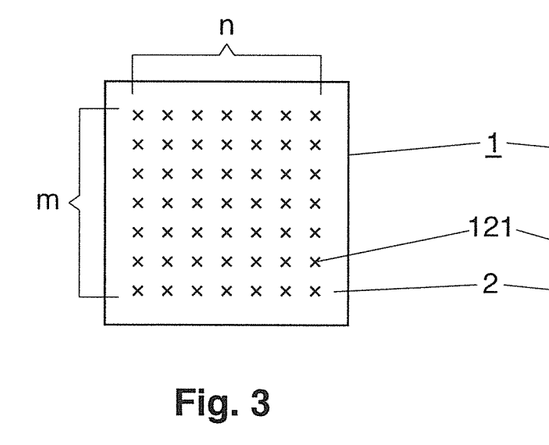
FIGS. 3-6 show additional embodiments of sensor plates, each in plan view.

FIGS. 3-6 show additional embodiments for a sensor plate 1, each in plan view. In the same way as in the illustration of FIG. 1, the wear sensors are each symbolized by an "x" in FIGS. 3-6. FIG. 3 illustrates the logic of a matrix arrangement for the wear sensors once again with the letters m and n: The parameter "m" defines the rows of measuring sensors 10 in vertical orientation (="rows"), wherein the parameter "n" defines the rows of measuring sensors in horizontal orientation (="columns").

Figure 4:
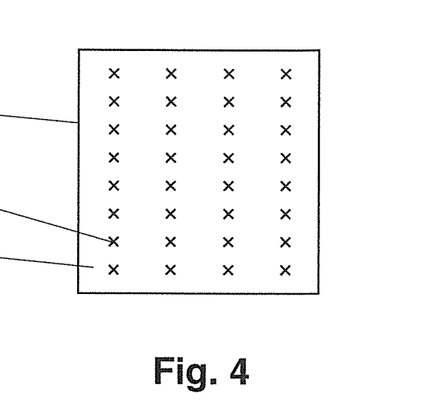

In the illustration of FIG. 3, the wear sensors 121 are arranged in the form of a 7×7 matrix. FIG. 4 shows an 8×4 matrix, FIG. 5 shows a 6×4 matrix, and FIG. 6 shows an 11×7 matrix for the arrangement of the wear sensors 121.

Figure 5:
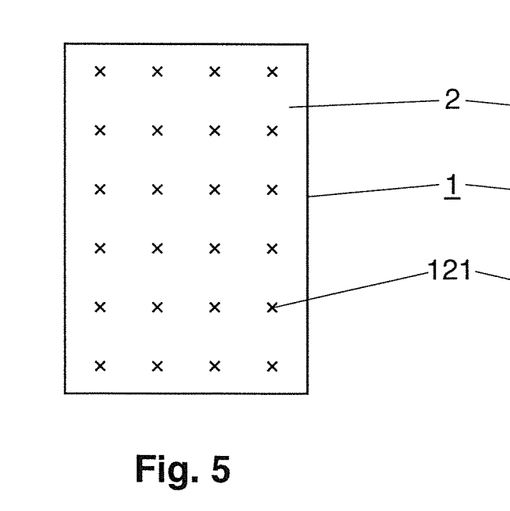
Figure 6:
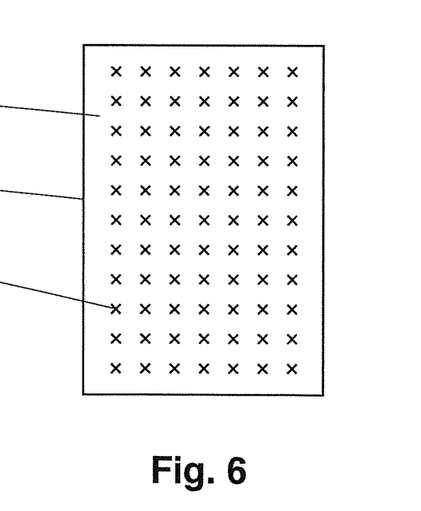

With respect to the sensor plates 1 in accordance with FIGS. 5 and 6, it is emphasized that, in contrast to the embodiments of FIGS. 1, 3 and 4, these are not formed to be square, but rectangular in shape. In any case, it is clear from the examples shown for the matrix arrangement in the embodiments of FIGS. 5 and 6 that, with the larger value for the parameter m as compared with the parameter n, it is achieved that the resulting matrix arrangement of the wear sensors 121 is adapted to the (rectangular) circumferential contour of the of the sensor plate 1.

At this point, it is emphasized that the embodiments shown here in accordance with FIG. 1 and FIGS. 3-6 for the matrix arrangements of the wear sensors 121 are only examples. In particular, it is the case that the possible number of wear sensors 121 in the vertical direction (=parameter m) or in the horizontal direction (=parameter n), as the case may be, can be essentially larger than the examples of FIG. 1 and FIGS. 3-6, if use is made of the available numerical range, which extends up to the value 100.

The device 100 is shown in combination with the sensor plate 1, likewise in FIG. 1. The device 20 comprises an evaluation apparatus A, which is in signal connection with the wear sensors 121 via a signal path S. Accordingly, the signal values of the individual measuring sensors can be received by the evaluation apparatus A.

The evaluation apparatus A is equipped with a communications module K. This makes it possible to transmit the data received from the evaluation unit A via an additional signal path S to a central computer system, hereinafter referred to as central system Z, which comprises a memory unit 5 and an evaluation unit 6. In FIG. 1, the aforementioned signal paths S are each symbolized with dotted lines.

The sensor plate 1 can be equipped with a machine-readable data memory 7, in which the measured values, in particular of the wear sensors 121, can be (temporarily) stored. Furthermore, the sensor plate 1 can be equipped with a transmission unit 8, for example to transmit the measured values of the wear sensors 121 stored in the data memory 7 to the evaluation apparatus A. Alternatively, the transmitting unit 8 can be in direct signal connection with the wear sensors 121, wherein, at that point, the measured values or signal values, as the case may be, of the measuring sensors 10 are sent directly from the transmitting unit 8 to the evaluation apparatus A during rolling operation.

The sensor plate 1 can be equipped with a data carrier 9 with machine-readable identification. By means of such a data carrier 9, it is possible both to uniquely identify the sensor plate 1 in a rolling mill and to locate its position within the rolling mill accordingly.

Figure 2:
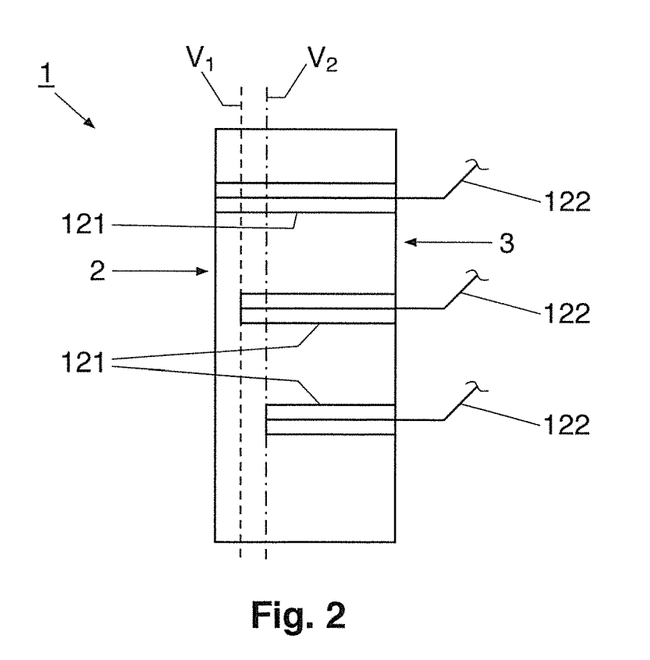
FIG. 2 is a cross-sectional view of a part of the sensor plate of FIG. 1.
Figure 7:
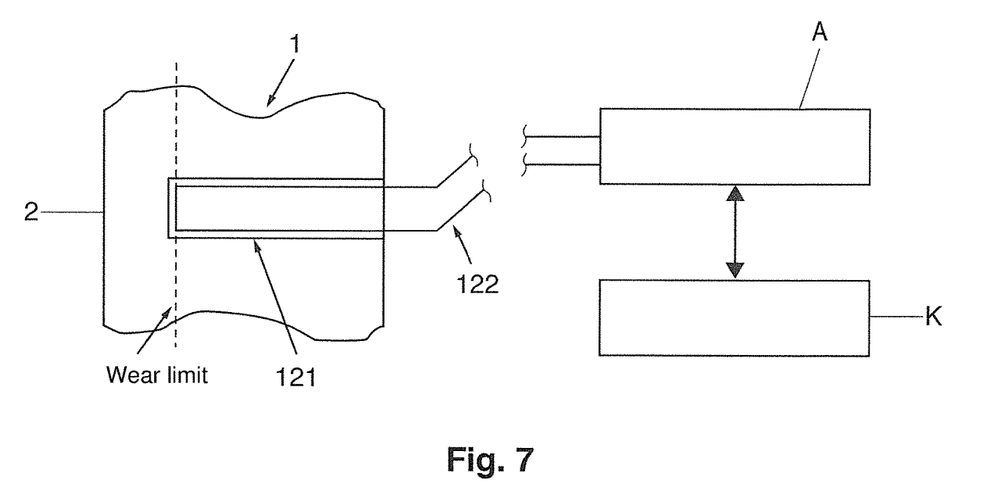
FIGS. 7-16 show additional details of the sensor plate of FIG. 1.

With reference to FIGS. 7-16, further details regarding the wear sensors 121 and their operation are explained below:

FIG. 7 shows the lower area of the sensor plate 1 of FIG. 2. Thereby, it can be seen that an electrical conductor 122 (in the form of a closed conductor track) of the wear sensor 121 is not routed to the plain bearing surface 2, but ends at a predetermined wear limit, symbolized here in simplified form by a dashed line and running parallel to the plain bearing surface 2. The electrical conductor 122 is in signal connection with the evaluation apparatus A, as explained.

The elongated rectangle, in which the electrical conductor 121 runs inside the sensor plate 1 in the embodiment of FIG. 7, represents a sensor unit. The base material of the sensor unit is designed to have at least the same hardness as the sensor plate 1, but ideally to be softer, such that it wears at least to the same extent as the sensor plate 1 if material is removed from its plain bearing surface 2 during rolling operation. The position of the conductor track or the electrical conductor 122, as the case may be, in the sensor unit is defined as precisely as possible, since this determines, among other things, the resolution of the wear of the sensor plate 1, and must be aligned at least partially as parallel as possible to the surface to be measured in the form of the plain bearing surface 2.

Figure 8:
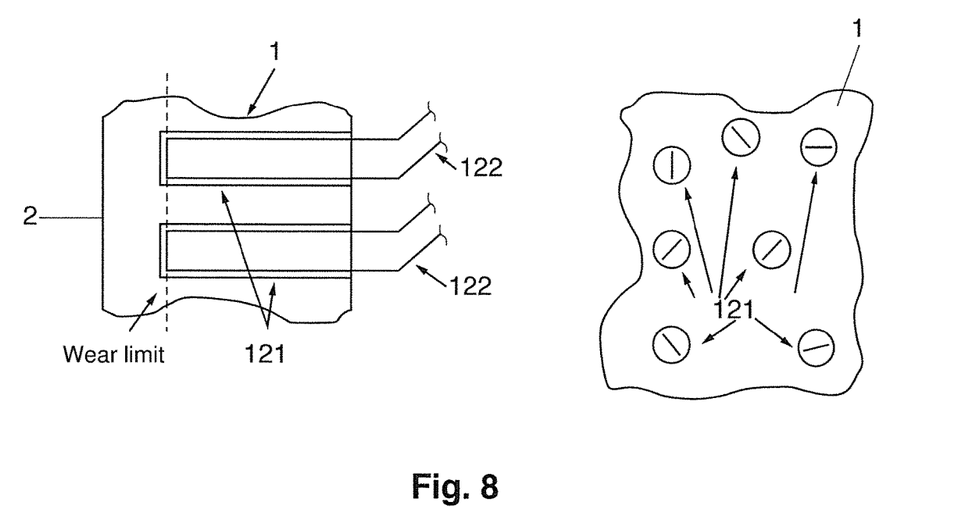

The cross-sectional view of the sensor plate 1 in accordance with FIG. 8 illustrates the uniform or regular, as the case may be, arrangement of two sensor units with the wear sensors 121.

Figure 9:
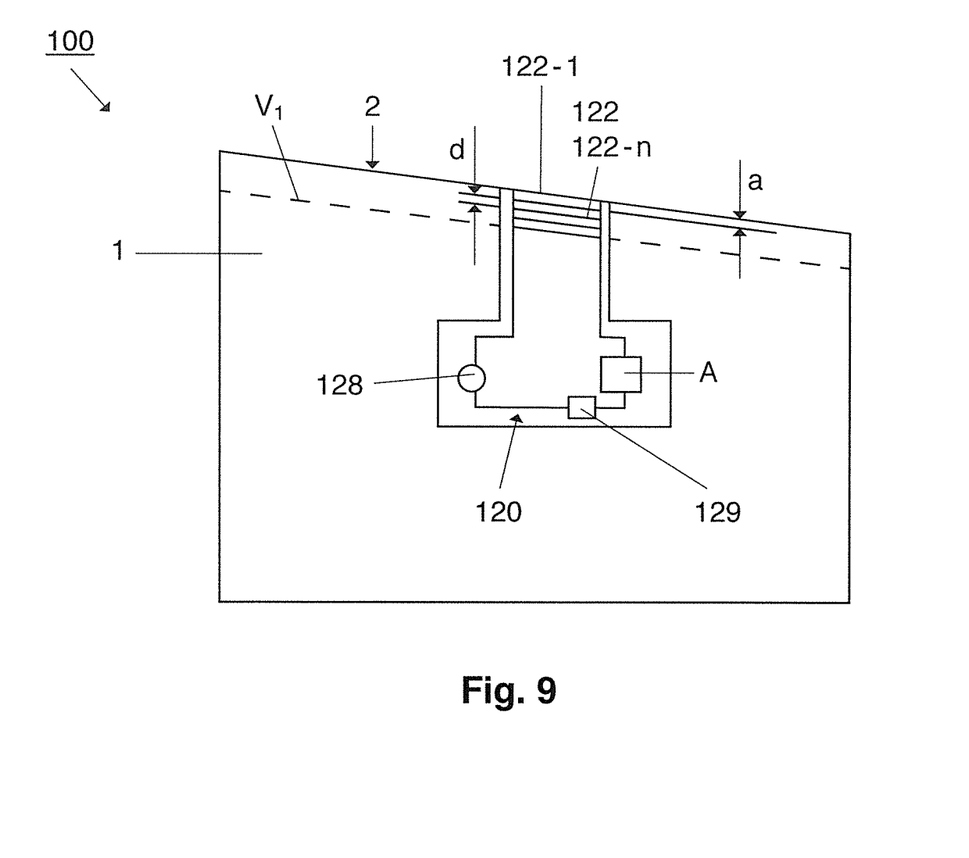

FIG. 9 shows the device 100 in an additional principal illustration. It comprises a measuring apparatus 120 that, in the embodiment shown here, is accommodated in an integrated manner in a cavity within the sensor plate 1. The measuring apparatus 120 has the aforementioned wear sensors 121, which are integrated into the plain bearing surface 2 of the sensor plate 1, in order to capture the material removal at the plain bearing surface in the event of wear. Furthermore, the measuring apparatus 120 comprises the evaluation apparatus A, which is in signal connection with the wear sensors 121. Accordingly, the signal values or measurement values, as the case may be, of the wear sensors 121 can be received by the evaluation apparatus A.

In addition, the measuring apparatus 120 can optionally further comprise a module 129 (see FIG. 9) for the preferably wireless transmission of measurement data or of evaluation data, which is generated by the evaluation apparatus A, to a remote location for further processing of the data.

FIG. 9 further illustrates that the electrical resistor or conductor 122, as the case may be, is formed of a plurality N of electrical conductors 122-$n$ with $1 \leq n \leq N$, which are arranged in sections parallel to each other and parallel to the wear surface in the form of the plain bearing surface 2. The distance of the individual conductors 122-$n$ from the original wear surface is indicated by the letter a. Here, the reference sign d denotes the distance between two adjacent conductors. The smaller this distance, the more accurate the resolution with which material removal at the wear surface in the form of the plain bearing surface 2 can be captured.

For the operation of the wear sensors 121, it is important that the electrical conductor 122 is always integrated into the wear surface to be ablated, in order to be ablated itself and in this way to experience a change in its ohmic resistance value.

The design of the electrical conductor 122 in accordance with FIG. 9 provides that the electrical conductors 122-$n$ are formed only in the region of the plain bearing surface 2 parallel to the latter and parallel to each other.

Figure 10:
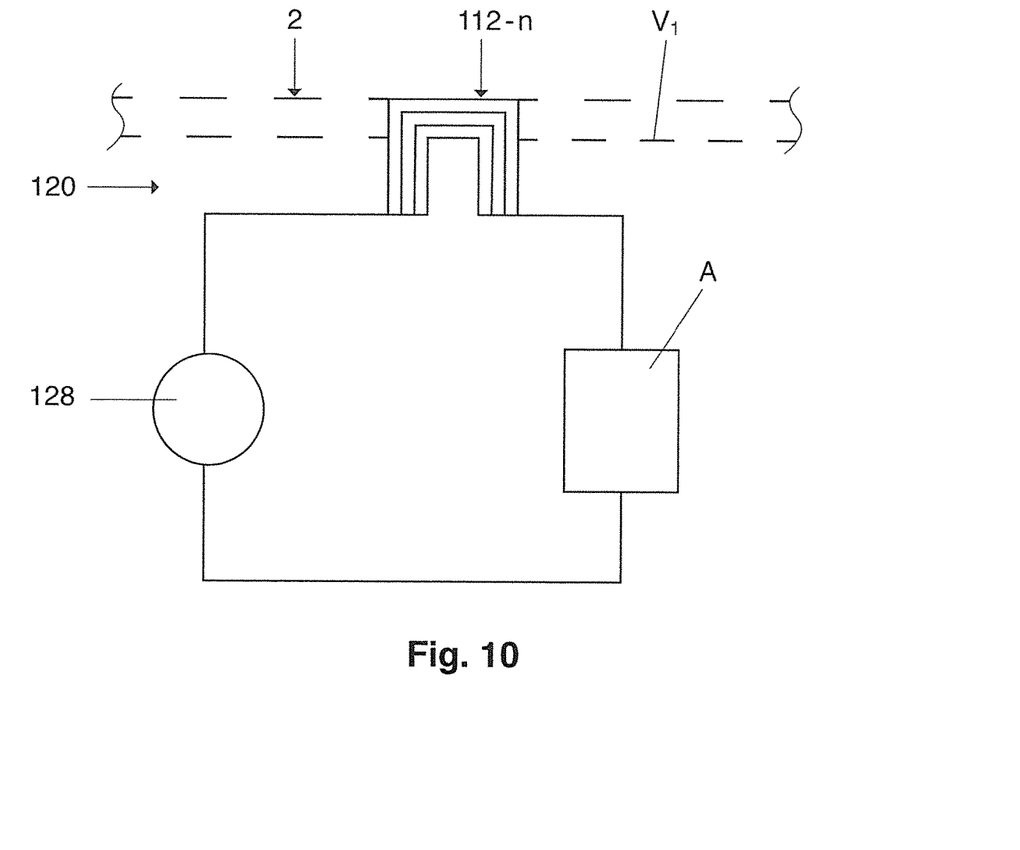

In connection with the wear sensors 121, FIG. 10 illustrates that the conductors or path regions 122-$n$ of the electrical conductor 122 can also be arranged parallel to each other in a U-shape, as an alternative to the embodiment of FIG. 9.

Figure 11:
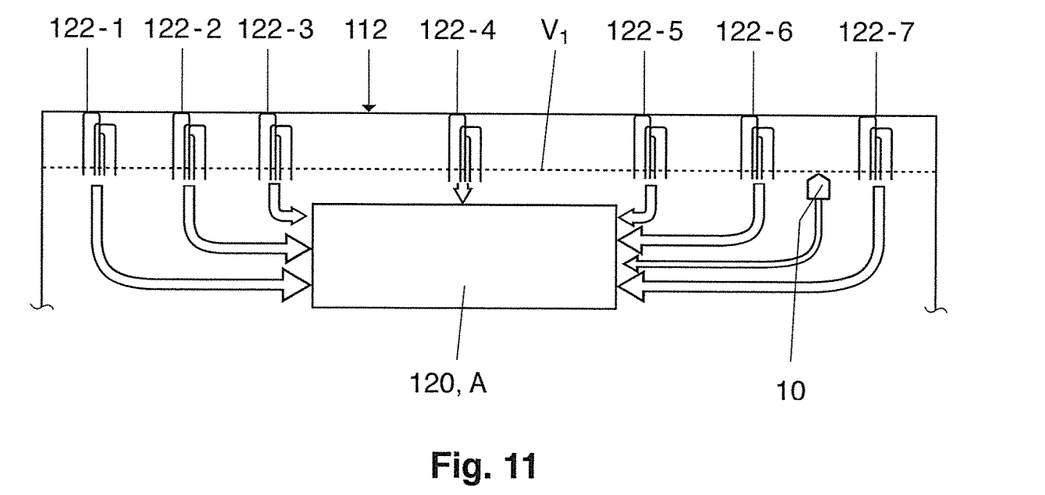

The arrangement of a plurality of wear sensors 121 in the form of an (n×m) matrix, for example in the form of a 7×7 matrix in the case of sensor plate 1 in accordance with FIG. 3, is shown once again in a cross-sectional view in FIG. 11. Here, it is possible that each of the individual resistors 122-$k$ with $1 \leq k \leq K = 7$ is assigned its own measuring apparatus 120. Alternatively, however, and as shown in FIG. 11, it is also possible for the individual electrical resistors 122-$k$ each to be connected via cable connections to a central measuring apparatus 120 and in particular to the central evaluation apparatus A (see FIG. 1, FIG. 9, FIG. 10).

Figure 12:
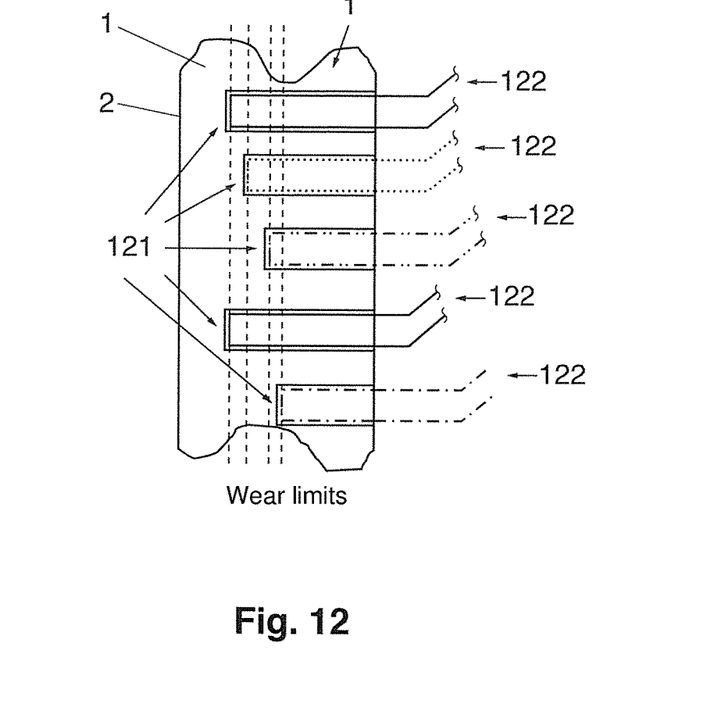

FIG. 12 shows a part of the sensor plate 1 in a cross-sectional view. From this, it can be seen that the electrical conductors 122 in the form of conductor tracks are each incorporated into the sensor plate 1 at different depths or at a different distance from the plain bearing surface 2. The vertical dashed lines in the illustration of FIG. 12 symbolize various wear limits for the plain bearing surface 2. The different depths at which the conductor tracks 122 are each accommodated in the sensor plate 1 are adapted to such different wear limits.

To determine a material removal at the plain bearing surface 2 with respect to different wear limits, it can also be provided that a single wear sensor 121 is equipped with a plurality of conductor tracks at different "depths" in each case, that is, distances running parallel to the plain bearing surface. Such a type of wear sensor is shown in simplified form in FIG. 13, which corresponds in principle to the wear sensor of FIG. 9.

Figure 13:
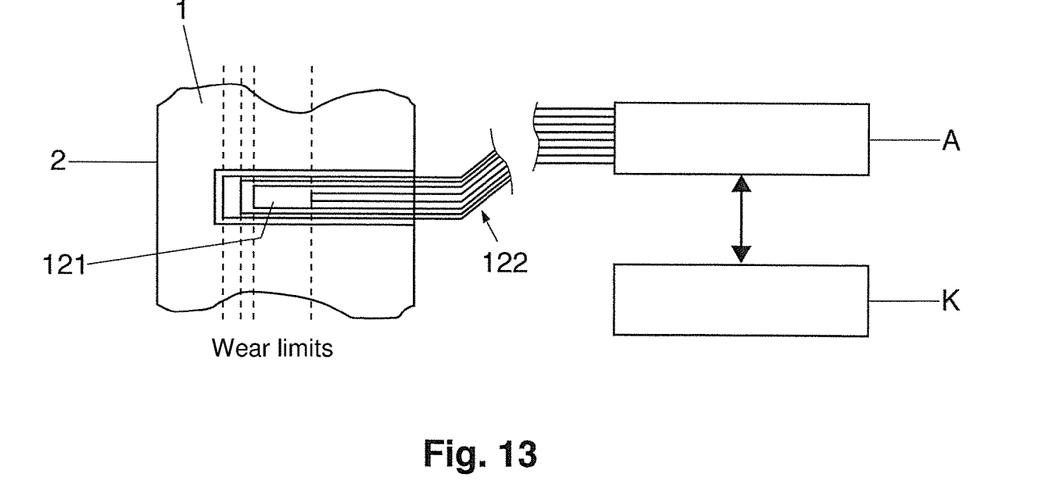
Figure 14:
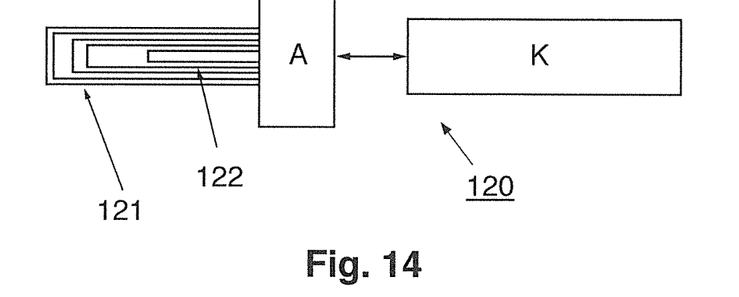

In FIG. 14, a measuring apparatus 120 with a wear sensor 121 of the type of the embodiment of FIG. 13 is shown, but here in the form of an integrated unit, which directly comprises the evaluation apparatus A, which is in signal connection with the communications module K. In the embodiment of FIG. 14, it can also be provided that the integrated unit also houses the power supply for the conductor tracks 122 of the wear sensor 121, such that a self-sufficient multi-stage wear measurement is enabled.

Figure 15:
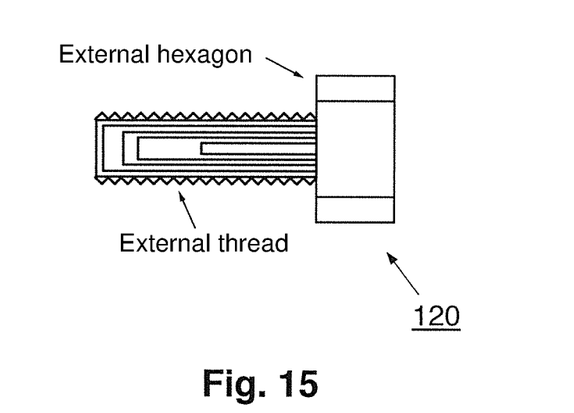

In an additional form of this embodiment of the measuring apparatus 120, the components just mentioned—as shown by the illustration in FIG. 15—can, for example, be integrated in an elongated pin, which is provided along its longitudinal extension with an external thread that is terminated by an external hexagon in the form of a nut head.

Figure 16:
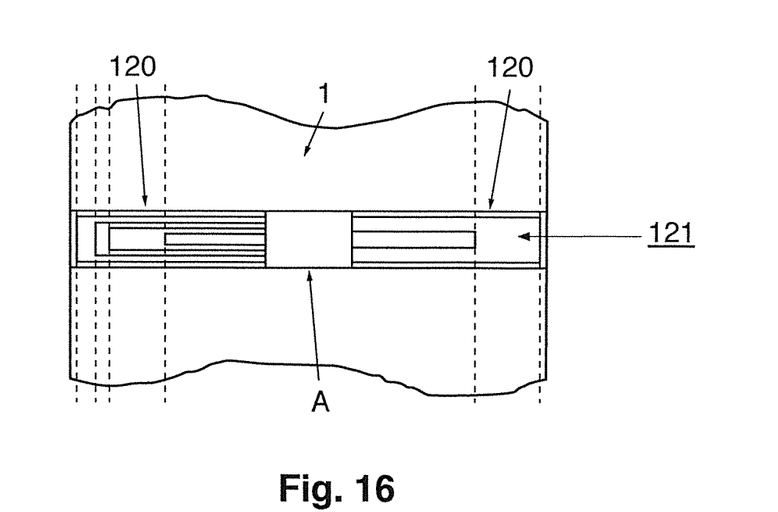

FIG. 16 shows an additional embodiment for the measuring apparatus 120 of the device 100, with which the evaluation apparatus A is connected to two sensor units (in FIG. 16, respectively on the left and right of the evaluation apparatus A shown in the center). This makes it possible to monitor wear on a plurality of sides of the sensor plate 1. The vertical dashed lines in the illustration of FIG. 16 indicate different wear limits, each of which is at a different distance from the wear surface in the form of the plain bearing surface 2.

Furthermore, it is also conceivable that, with the embodiment of FIG. 16, more than two wear sensors 121 are connected to the evaluation apparatus A.

In addition to the wear sensors 121, a sensor plate 1 can also be equipped with measuring sensors 10, each of which is accommodated within the sensor plate 1 adjacent to the plain bearing surface 2. Such an embodiment is shown in the illustration of FIG. 17, wherein the measuring sensors 10 are each symbolized here with small circles.

With respect to the measuring sensors 10, it should be emphasized that they are not directly exposed on the plain bearing surface 2 of the sensor plate 1, as will be explained below.

Figure 17:
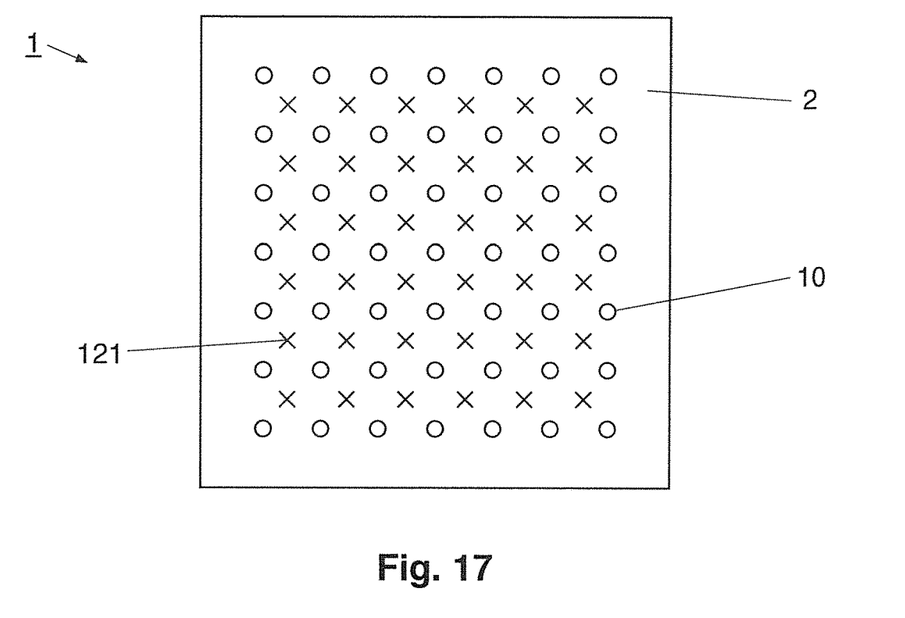
FIG. 17 shows an additional embodiment of a sensor plate, in plan view.

As shown in the plan view of FIG. 17, such measuring sensors 10 are arranged in this embodiment in the form of a 7×7 matrix, specifically adjacent to the plain bearing surface 2, and are positioned in this way in a manner offset from the wear sensors 121, which are integrated here in the form of a 6×6 matrix in the plain bearing surface 2. It is important here that the measuring sensors 10 are not directly exposed to the plain bearing surface 2, which has the consequence that the measuring sensors 10 are not damaged or destroyed, as the case may be, in the event of material removal from the plain bearing surface 2 during rolling operation. In this respect, the circles used to symbolize the measuring sensors 10 in the form of the arrangement of a 7×7 matrix in the illustration of FIG. 17 are to be understood merely as a simplification, and are only intended to illustrate the position of such measuring sensors 10 adjacent to the plain bearing surface 2.

Figure 18:
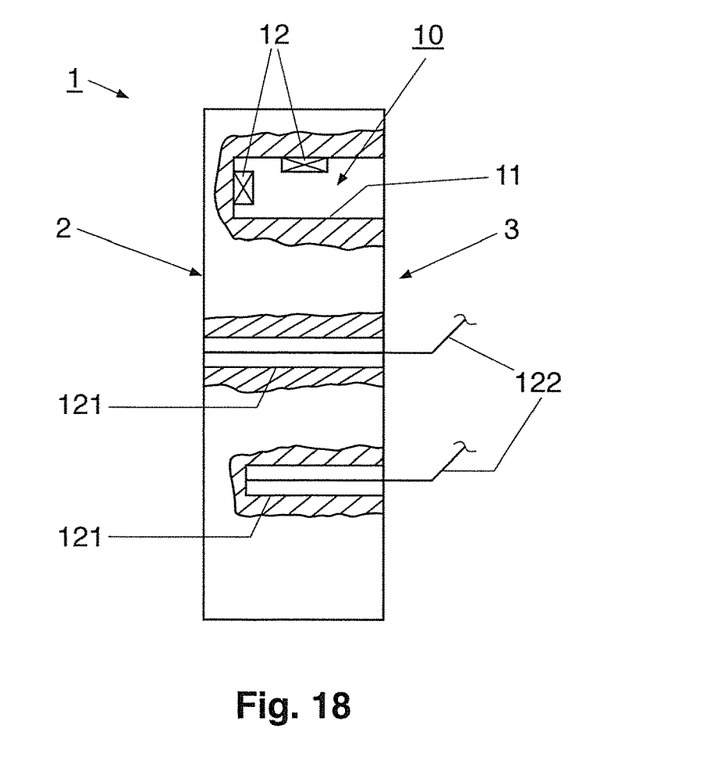
FIG. 18 is a cross-sectional view of a part of the sensor plate of FIG. 17.

The attachment of the measuring sensors 10 to or within the sensor plate 1 can be carried out by means of blind holes 11, which—as shown in the upper region of the cross-sectional view of FIG. 18—are introduced therein from a rear side 3 of the sensor plate 1 opposite the plain bearing surface. Furthermore, the accommodation of the conductor tracks 122 shown in the cross-sectional view of FIG. 18 centrally and in the lower region of the sensor plate 1 corresponds to the illustration of FIG. 1, such that reference may be made to them in order to avoid repetition.

A measuring sensor 10 can have a strain gauge, also known as a SG (strain gauge) element, or can be in the form of such a SG element 12. For this case, a SG element 12 can be attached to the front side of a blind hole 11 and/or to the inner circumferential surface of such blind hole 11. In any case, a measuring sensor 10 makes it possible to detect forces and/or strains and/or deformations acting on the sensor plate 1 during rolling operation.

In all of the embodiments specified above of the device 20, it can be provided that the evaluation apparatus is equipped with a power source 128 (see FIG. 1, FIG. 11, FIG. 12). Such a power source 128 can, for example, be conventionally formed by batteries or rechargeable batteries or can be, for example, cabled. Alternatively, it is also possible to design the power source as an energy harvesting unit, with which energy can be obtained either thermally and/or mechanically.

Regardless of the type of power source 128, this power source 128 may be used to supply power not only to the evaluation apparatus A, but also to the various sensors of the sensor plate 1, that is, the wear sensors 121 and possibly also the measuring sensors 10, and furthermore also to the various electrical components, which can be provided on or attached to a sensor plate 1, for example the machine-readable data memory 7, the transmission unit 8 and/or the data carrier 9 with machine-readable identification for the unambiguous identification of the sensor plate 1. In this way, the device 20 is then an energy self-sufficient system that does not rely on a separate external power source.

With respect to the power source 128, according to an additional (not shown) variant, it can be provided that the energy harvesting unit does not "bring to life" the connected systems (evaluation unit A and/or sensor unit with the wear sensors 121) until sufficient energy is available to operate the system or systems, as the case may be. This procedure can be used especially for very slowly wearing components.

Figure 19:
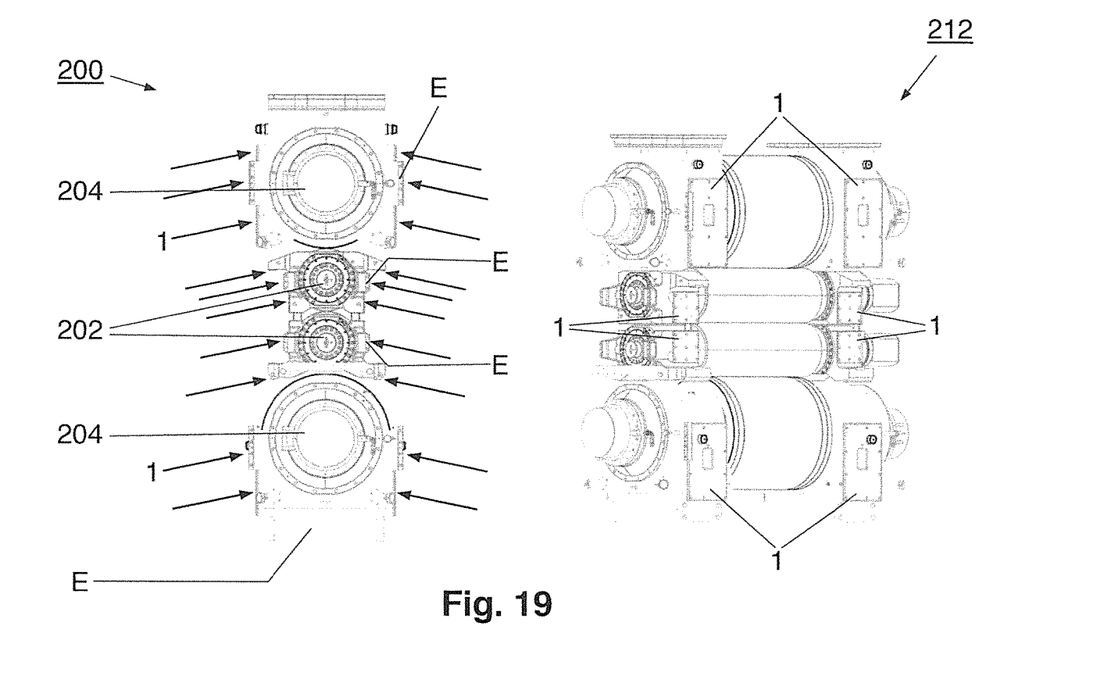
FIG. 19 shows a set of rolls consisting of backup and work rolls including chocks, each in a side view and a view from the front.

FIG. 19 shows a rolling mill 200, with two work rolls 202 and two backup rolls 204, including the associated chocks E. The plurality of individual arrows, each directed in the direction of the rolling mill in FIG. 19 (in the left image), illustrate the positions where the sensor plates 1 are provided or attached to the associated chocks E in each case.

The right image of FIG. 19 shows the rolling mill 200 in simplified perspective view, wherein one set of rolls is labeled "212" here. Furthermore, in the right image of FIG. 19, some of the plates provided here are marked with "1," wherein those at the rear side of the rolling mill cannot be seen here.

Figure 20:
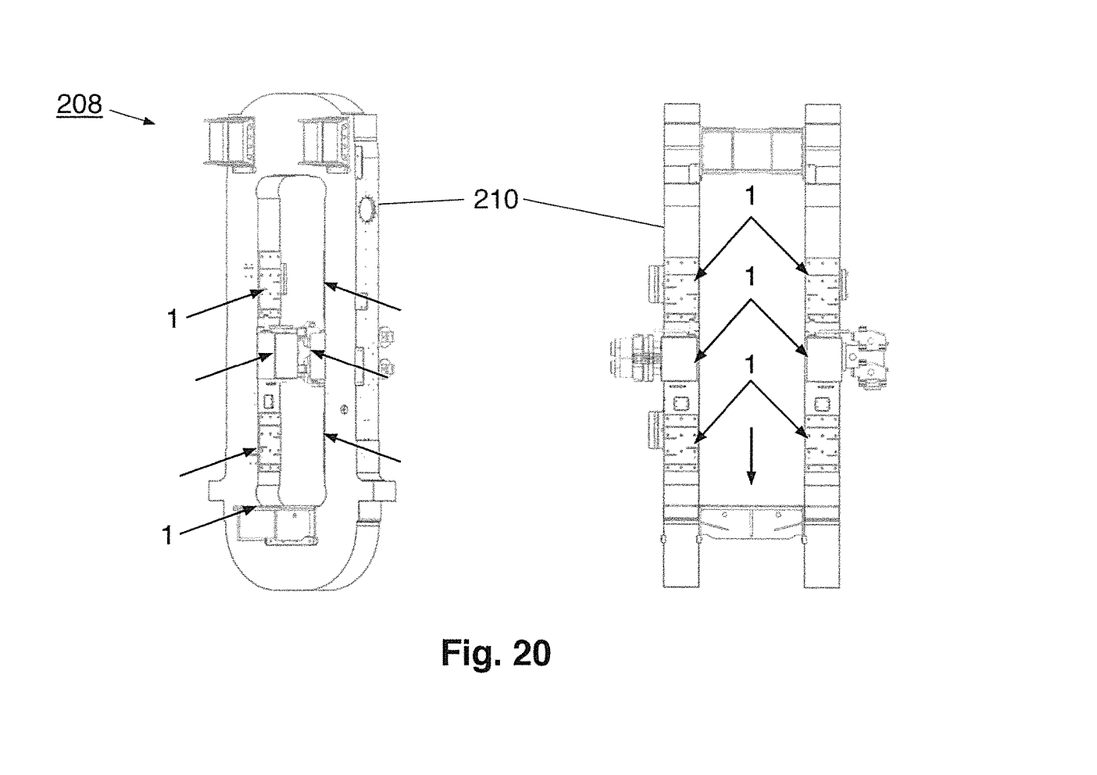
FIG. 20 shows a rolling mill housing, in each case in a perspective view and in a side view, to which sensor plates are attached.
Figure 21:
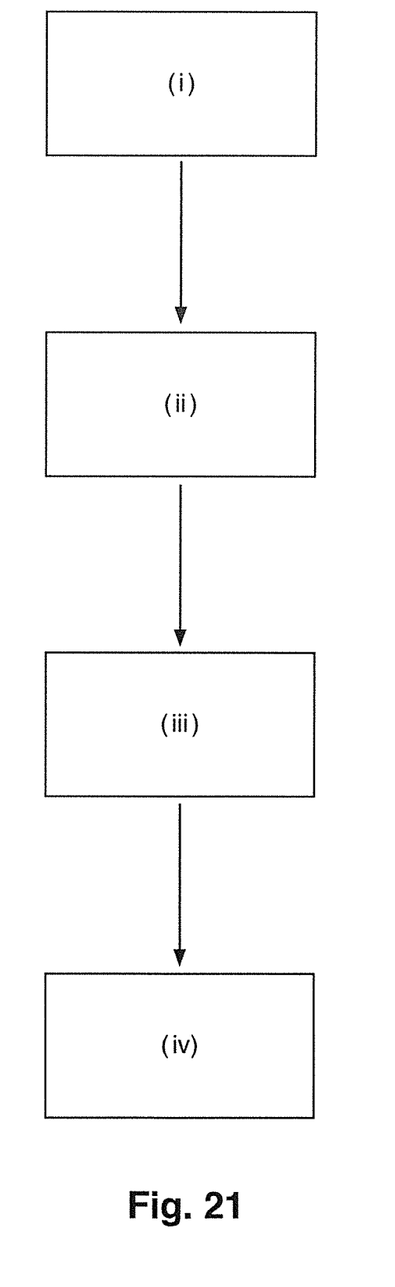
FIG. 21 illustrates the sequence of steps of a method for measuring a wear condition of plain bearing or guide elements during the operation of a rolling mill.

FIG. 20 shows a rolling mill housing 208, which is provided for a rolling mill 200 of FIG. 19, in each case in a perspective view (left image) and in a frontal view (right image). In the same way as in FIG. 19, here in FIG. 20, the arrows indicate the points at which the plates 1 are attached to the mill housing posts 210 of the rolling mill housing 208.

The sensor plates 1, whose attachment points are indicated by the individual arrows in FIG. 19 and FIG. 20, can be the sensor plates 1 according to one of the embodiments in accordance with FIG. 1-6 or FIG. 17.

FIG. 21 shows a flowchart for illustrating a method for measuring a wear condition of plain bearing or guide elements during the operation of a rolling mill with its steps (i) to (iv), with which preferably the device 100 explained above is used. Thanks to the wear sensors 121, which are integrated into the plain bearing surface 2 of a sensor plate 1 (as explained), the wear on the plain bearing surface 2 of the respective sensor plates 1 can be determined or measured "online," that is, during ongoing rolling operation. The associated method steps (i) to (iv) are determined as follows:

(i) determining a wear condition on a sensor plate 1, which is attached to a chock E of a roll 202, 204 of a rolling mill 200, and a current geometry (topography) of the associated plain bearing surface 2, (ii) determining a wear condition on a sensor plate 1, which is attached to a rolling mill housing 208 of a rolling mill and a current geometry (topography) of the associated plain bearing surface, (iii) carrying out steps (i) and (ii) for all sensor plates 1, which are attached to chocks E of rolls and to the rolling mill housings 208 of the rolling mill 200; and (iv) transmitting the measured values of step (iii) to a central system Z with a storage and evaluation unit (5, 6), wherein such measured values are each assigned to a certain set of rolls consisting of a certain roll, the chocks provided therefor and the sensor plate attached to them, and to a certain rolling mill housing of the rolling mill with a sensor plate.

The main advantage of the supplementary method just mentioned for determining the state of wear on the plain bearing surfaces 2 of the sensor plates 1 is, among other things, that the current state of wear or the current topography, as the case may be, of sensor plates for a pairing of a certain set of rolls and a certain rolling mill housing can be compared with a first predetermined limit value, while the rolling operation is still in progress. If this first predetermined limit value is thereby exceeded, at least one warning signal can be triggered to initiate a check of the rolling mill and/or the set of rolls. In the course of this, it is also possible to define a second predetermined limit value, which, if exceeded, then at least triggers a warning signal for an operating stop of the rolling mill or, if necessary, an emergency stop for the rolling mill is automatically initiated.

At this point, it is once again pointed out that the feature "set of rolls" can be:
- a unit formed by rolls, chocks and sensor plates attached to them,
- a unit consisting of a work roll, a backup roll and an intermediate roll, along with the associated chocks and sensor plates attached to them, and/or
- cluster mills.

It is also pointed out that sets of rolls can be provided with new or different chocks, for example upon a changeover of a rolling mill during a production interruption. In other words, for example, during a changeover, it is possible to reassemble or reconfigure, as the case may be, each of the examples specified above of sets of rolls, specifically by mounting different chocks with the sensor plates attached to them on a certain roll.

Carrying out the method specified above and step (iv) thereof is particularly recommended if an operation of the rolling mill 200 is stopped in preparation for a changeover. For the purposes of the present disclosure, "changeover" means, for example, the replacement of sets of rolls (=rolls plus chocks E including the sensor plates 1 attached to them), in order to implement changed production conditions. In any case, this can then be used to generate wear data for the plain bearing surfaces 2 of the individual sensor plates 1, which represent the current state or "last state of affairs," as the case may be, of the sensor plates 1 prior to the operating stop.

Finally, taking into account that, as just explained, wear data can be obtained by means of the wear sensors 121 with respect to the plain bearing surfaces 2 of the sensor plates 1, suitable measures for production planning can be taken for at least one rolling mill or for a plurality of rolling mills, in particular in the form of heavy metal plates, cluster milers or in the form of a warm-rolling or cold-rolling train, specifically by the sequence of the following steps:

(i) provision by the evaluation unit 6 of the central system Z (see FIG. 1) of measured values with respect to the state of wear of sensor plates 1 and the resulting topography on their plain bearing surfaces 2, which measured values are assigned to certain sets of rolls 212 and certain rolling mill housings 208 of a rolling train and have been stored in the memory unit 5 of the central system Z, (ii) reading out the measured values from step (i) by the evaluation unit 6 of the central system Z, (iii) comparing the topography or current geometry of the plain bearing surfaces 2 of certain chocks (E), on the one hand, and of certain rolling mill housings 208 of a rolling mill 200, on the other hand, and (iv) assigning a certain set of rolls, consisting in particular of a roll (202; 204), the chocks (E) provided therefor along with the sensor plates (1) attached to them, to a certain rolling mill housing in dependence on the planned new production conditions and in dependence on the fact that, in step (iii), a match has been established between the topography of the plain bearing surfaces, on the one hand, of the sensor plate of a certain chock and, on the other hand, of a certain rolling mill housing (208) of a rolling train.

With respect to steps (iii) and (iv) of the method just mentioned, it may be pointed out by way of explanation that, in the course of production planning, if a rolling mill is to be equipped with new or different rolls, it is also possible to dismantle chocks from the rolls in conjunction with the sensor plates attached to them. Subsequently, there can be a check of which chocks are suitable or permissible for which type or size of roll, wherein then, on the basis of step (iii), there is a determination of whether for such a permissible chock E and the sensor plate 1 attached to them there also exists a "matching partner" in the form of another sensor plate 1 attached to a rolling mill housing 208, provided that the plain bearing surfaces of the respective sensor plates with their (wear) topographies match. If such "matching partners" are found with respect to the sensor plates 1, then a chock with the matching sensor plate attached to them can be mounted on the intended roll and completed to form a set of rolls, which is then assigned to a certain rolling mill housing with the matching sensor plate attached to it in accordance with step (iv) of the method under discussion herein.

Step (iv) of the method or sequence of steps, as the case may be, for production planning just mentioned is carried out with the aim of producing or achieving, as the case may be, the best possible production conditions by means of the defined pairings of rolling mill housings and sets of rolls, with respect to which the topography of the plain bearing surfaces 2 of the associated sensor plates 1 matches. If it is possible to find matching pairs of rolling mill housings and sets of rolls, on the one hand, an otherwise costly reworking or even replacement of sensor plates 1 can at least be postponed. On the other hand, this creates the best possible production conditions through the use of the so-called "matching partners."

LIST OF REFERENCE SIGNS

1 Sensor plate
2 Plain bearing surface (=wear surface)
3 Rear side (of sensor plate 1)
4 Lateral edge surface (of sensor plate 1)
5 Memory unit
6 Evaluation unit
7 Machine-readable data memory
8 Transmitting unit
9 Data carrier with machine-readable identifier, for unique identification of a sensor plate 1
10 Measuring sensor(s)
11 Blind hole
12 SG element
20 Device for determining the position and/or the location of a roll in a rolling mill
100 Device for measuring a wear condition
120 Measuring apparatus
121 Wear sensor(s)
122 Electrical(r) conductor
128 Power source
129 Module for data transmission
200 Rolling mill
202 Work roll(s)
204 Backup roll(s)
208 Rolling mill housing
210 Mill housing post
212 Set of rolls
a, b Integer parameters from the range {1-100}
m, n Integer parameters from the range {1-100}
A Evaluation apparatus
E Chock
K Communications module
S Signal path
$V_1$ First wear limit
$V_2$ Second wear limit
Z Central system
α (Possible) angle between two roll axes 206

The invention claimed is:

1. A sensor plate (1) serving as a plain bearing or guide element for rolling mills (200), comprising:
a plain bearing surface (2) that can be brought into contact with a component and is subject to wear during operation of a rolling mill (200); and
a plurality of wear sensors (121), which are arranged in form of an (m×n) matrix integrated into the plain bearing surface (2) with at least one of the parameters (m) and (n) being two or greater than two,
a plurality of measuring sensors (10) accommodated in an integrated manner in the sensor plate (1) and arranged in form of an (a×b) matrix adjacent to the plain bearing surface (2) in such a way that the measuring sensors (10) are not subject to wear on the plain bearing surface (2) and are capable of capturing forces and/or strains and/or deformations acting on the sensor plate (1), which arise as a result of surface, line or point contact of the sensor plate (1) with the component,
wherein the parameters (a) and (b), with which the (a×b) matrix for the arrangement of the measuring sensors (10) is formed, each consist of integer values selected from the numerical range {1-100},
wherein the wear sensors (121) are suitable for capturing a material removal on the plain bearing surface (2) and for this purpose each comprise an electrical resistor, which is formed from at least one electrical conductor (122), and
wherein the wear sensors (121) are mechanically removed with the material removal on the plain bearing surface (2).

2. The sensor plate (1) according to claim 1, wherein the electrical resistor of a wear sensor (121) is formed by a plurality of electrical conductors (122), which are arranged at least in sections in parallel and at different depths with respect to the plain bearing surface (2).

3. The sensor plate (1) according to claim 1, wherein a plurality of blind holes (11) are formed in the sensor plate (1), which are introduced into the sensor plate (1) from a main surface (3) opposite the plain bearing surface (2) and/or from a lateral edge surface (4), and
wherein the measuring sensors (10) are inserted in the respective blind holes (11).

4. The sensor plate (1) according to claim 1, wherein the parameters m and n, with which the (m×n) matrix for the arrangement of the wear sensors (121) is formed, and the parameters a and b, with which the (a×b) matrix for the arrangement of the measuring sensors (10) is formed, each consist of integer values, in such a way that the matrix arrangement of the wear sensors (121) or measuring sensors (10) is thus adapted to a circumferential contour of the sensor plate (1).

5. The sensor plate (1) according to claim 1, wherein the parameters m and n, with which the (m×n) matrix for the arrangement of the sensors is formed each consist of integer values selected from the numerical range {2-100}.

6. The sensor plate (1) according to claim 1, further comprising at least one machine-readable data memory (7) in which signal values or measurement values of the wear sensors (121) or measuring sensors (10) can be stored.

7. The sensor plate (1) according to claim 1, further comprising a data carrier (9) with a machine-readable identifier by which the sensor plate (1) can be uniquely identified.

8. The sensor plate (1) according to claim 1, further comprising a transmitting unit (8) which is in signal connection with the wear sensors (121) or measuring sensors (10) and by which the measured values of the sensors can be transmitted to an evaluation apparatus (A) via a radio link or by cable.

9. The sensor plate (1) according to claim 1, wherein the sensor plate (1) it is attached to a chock (E) of a roll (202; 204) of a rolling mill (200).

10. The sensor plate (1) according to claim 1,
wherein the sensor plate (1) is attached to a rolling mill housing (208) of a rolling mill (200).

11. A device (100) for measuring a wear condition on the plain bearing surface (2) of the sensor plate (1), comprising:
a measuring apparatus (120), which comprises the plurality of the wear sensors (121) of the sensor plate (1) integrated in the plain bearing surface (2) according to claim 1, in order to capture the material removal at the plain bearing surface (2) due to wear; and
an evaluation apparatus (A) that is in signal connection with the plurality of the wear sensors (121) or measuring sensors (10), and from which signal values of the individual wear sensors (121) can be received,
wherein the evaluation apparatus (A) is programmed such that an increase in an ohmic resistance value of the electrical conductor (122) of a certain wear sensor (121) can be captured in dependence on its own material removal, in order to thereby ensure that an amount of the material removal at the plain bearing surface (2) and/or remaining thickness of the plain bearing surface (2) at a location of said certain wear sensor (121) can be inferred from the captured increase in the resistance value.

12. The device (100) according to claim 11,
wherein a central system (Z) is in signal connection with the evaluation apparatus (A) and has a memory unit (5) and evaluation unit (6),
wherein data of the evaluation apparatus (A) can be transmitted to the central system (Z) via a signal path (S) and can be evaluated therein.

13. The device (100) according to claim 11,
wherein the evaluation apparatus (A) is equipped with a power source (128),
wherein the evaluation apparatus (A) is connected to the wear sensors (121) in such a way that the wear sensors (121) are supplied with energy via the power source (128).

14. The device (100) according to claim 13,
wherein the power source (128) is an energy harvesting unit.

15. A method for measuring a wear condition of plain bearing or guide elements during the operation of the rolling mill (200) with the device (100) according to claim 11, comprising:
(i) determining a wear condition on the sensor plate (1) that is attached to a chock (E) of a roll (202; 204) of the rolling mill (200) and a current geometry (topography) of an associated plain bearing surface (2),
(ii) determining a wear condition on the sensor plate (1) that is attached to a rolling mill housing (208) of the rolling mill (200) and a current geometry (topography) of the associated plain bearing surface (2),
(iii) carrying out steps (i) and (ii) for all sensor plates (1) attached to chocks (E) of rolls and to rolling mill housings (208) of the rolling mill (200), and
(iv) transmitting the measured values of step (iii) to a central system (Z) with a memory and evaluation unit (6), wherein such measured values are each assigned to a certain set of rolls (212) consisting of a certain roll (202; 204), the chocks (E) provided therefor and the sensor plate (1) attached to them, and to a certain rolling mill housing (208) of the rolling mill (200) with the sensor plate (1).

16. The method according to claim 15,
wherein step (iv) is carried out before stopping the operation of the rolling mill (200) in preparation for a changeover.

17. The method according to claim 15,
wherein the current wear condition or topography of sensor plates (1) for a pairing consisting of a particular set of rolls (212) and a particular rolling mill housing (208) is compared with a first predetermined limit,
wherein, if such first predetermined limit value is exceeded, a warning signal is triggered for initiating a check or maintenance of the rolling mill (200) and/or the set of rolls (212).

18. A method for production planning for at least one rolling mill (200) or for a plurality of rolling mills (200), comprising:
(i) providing measured values with respect to a state of wear of sensor plates (1) according to claim 1 and resulting topography on their plain bearing surfaces (2), which measured values are assigned to certain sets of rolls (212) and certain rolling mill housings (208) of the rolling mill and have been stored in a memory unit (5) of a central system (Z);
(ii) reading out the measured values from step (i) by an evaluation unit (6) of the central system (Z);
(iii) comparing the topography or a current geometry of the plain bearing surfaces (2) of certain chocks (E) and of the certain rolling mill housings (208) of the rolling mill (200); and
(iv) assigning a certain set of rolls (212), consisting in particular of a roll (202; 204), the chocks (E) provided therefor along with the sensor plate (1) attached to them, to a certain rolling mill housing (208) in dependence on planned new production conditions and in dependence on a match having been established in step (iii) between the topography of the plain bearing surfaces (2) of the sensor plate (1) of a certain chock (E) and of the certain rolling mill housing (208) of a rolling train.

* * * * *